April 12, 1938.　　　　J. F. JOY　　　　2,113,760
APPARATUS FOR HANDLING MATERIAL
Filed July 1, 1935　　6 Sheets-Sheet 2
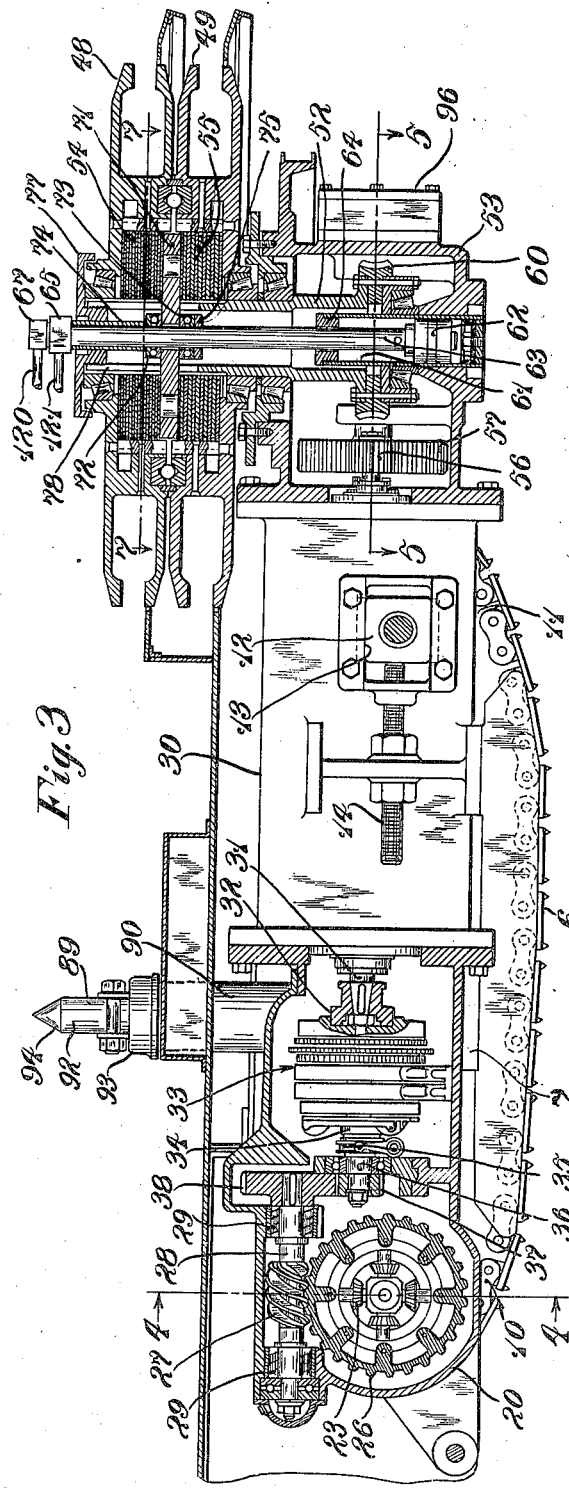
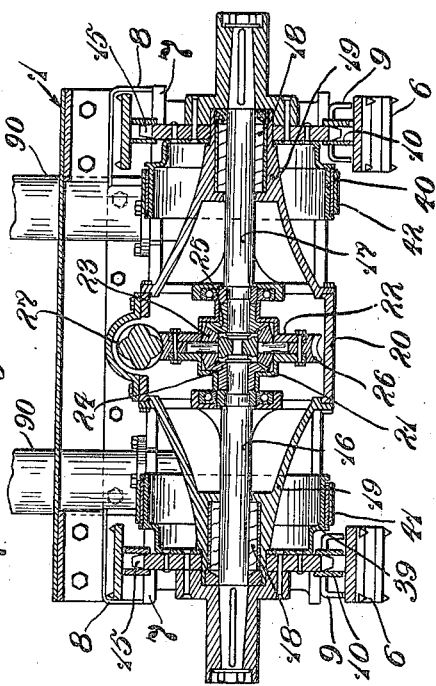
Inventor:
Joseph F. Joy
by Louis A. Waxson.
Atty.

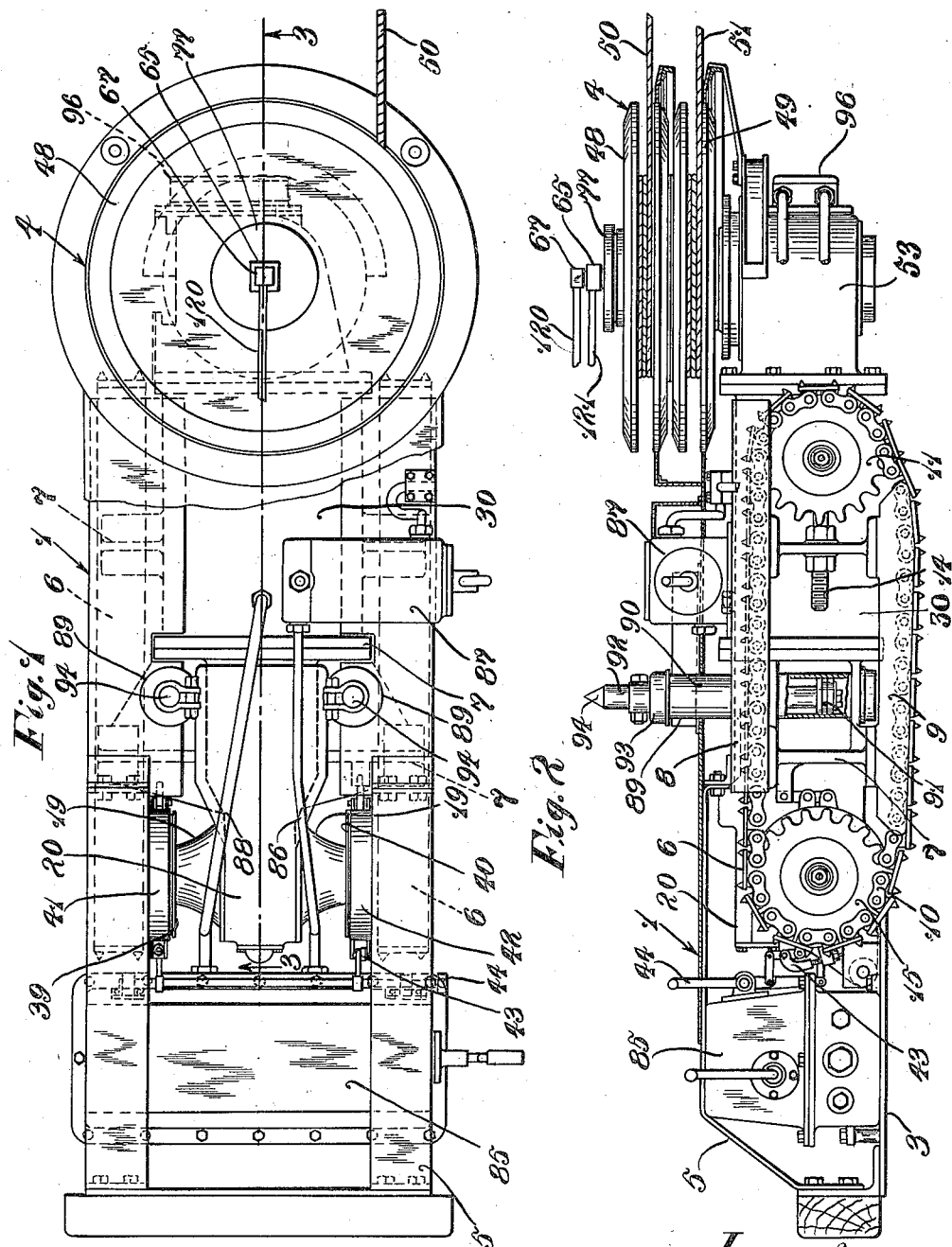

April 12, 1938. J. F. JOY 2,113,760
APPARATUS FOR HANDLING MATERIAL
Filed July 1, 1935  6 Sheets-Sheet 3
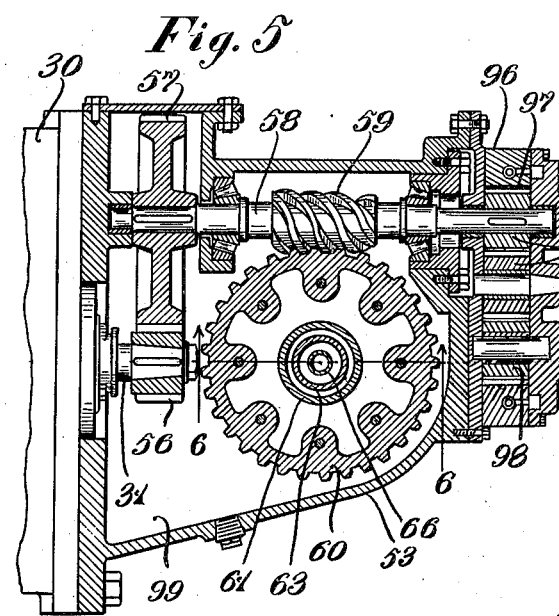
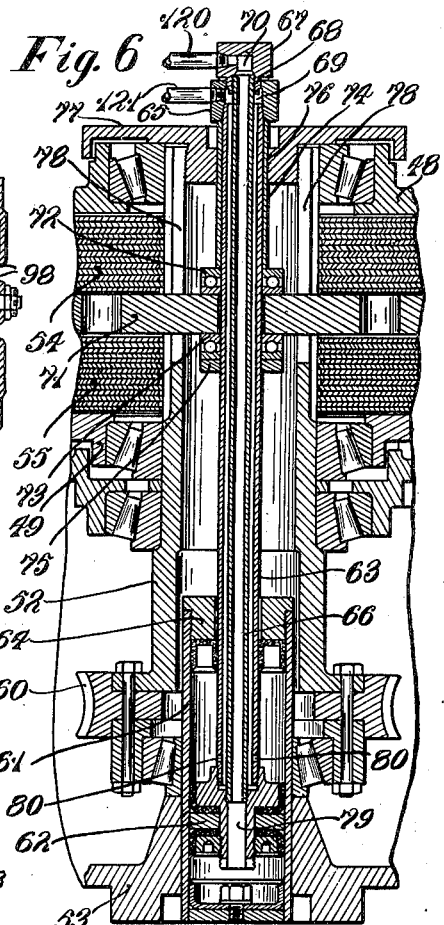
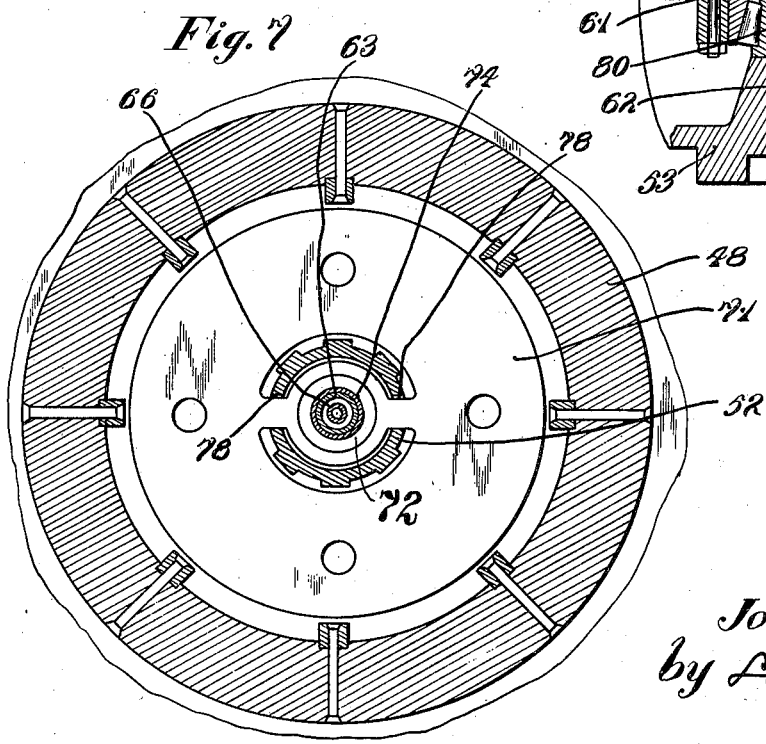
Inventor:
Joseph F. Joy
by Louis A. Maxom
Atty.

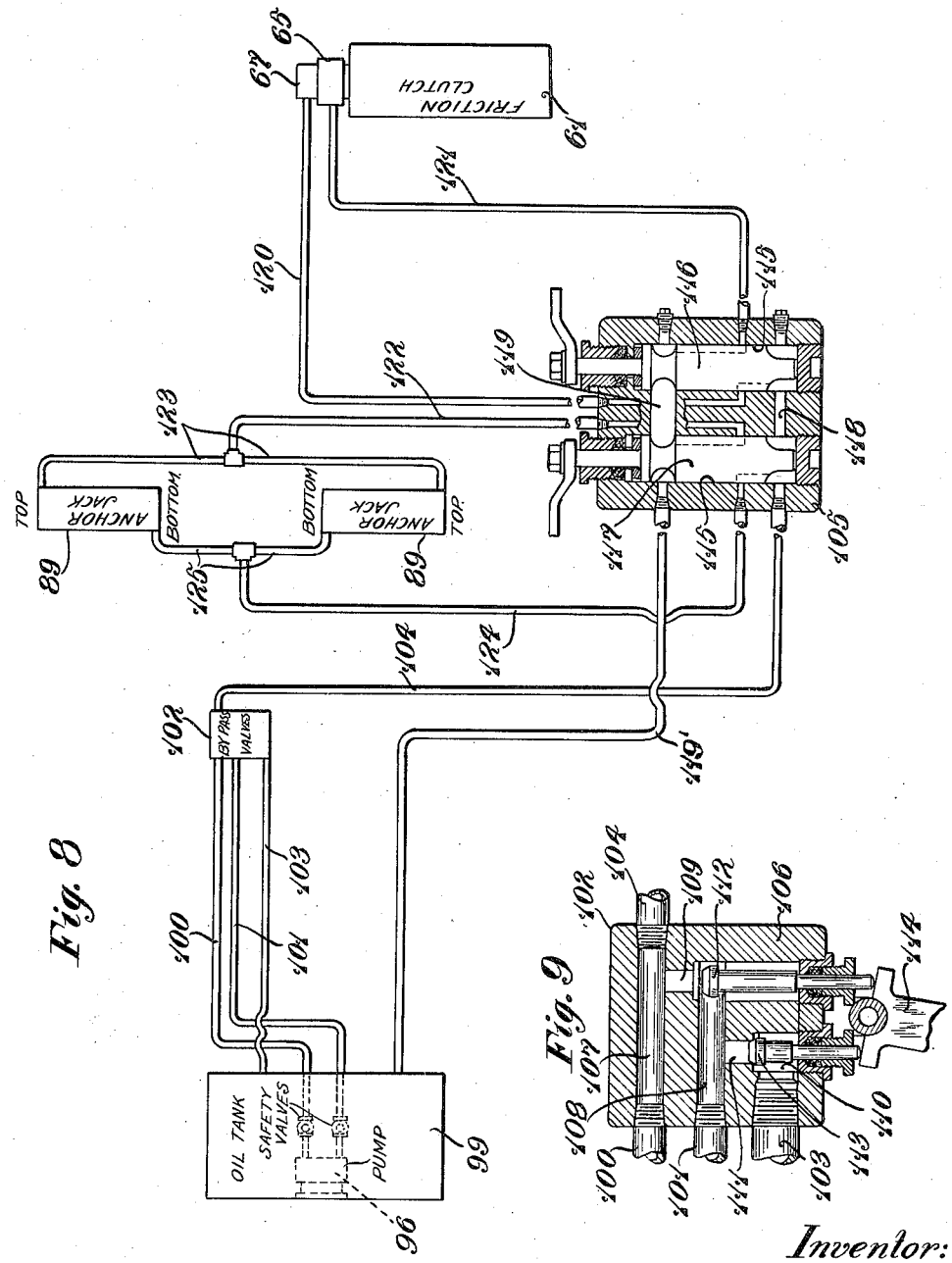

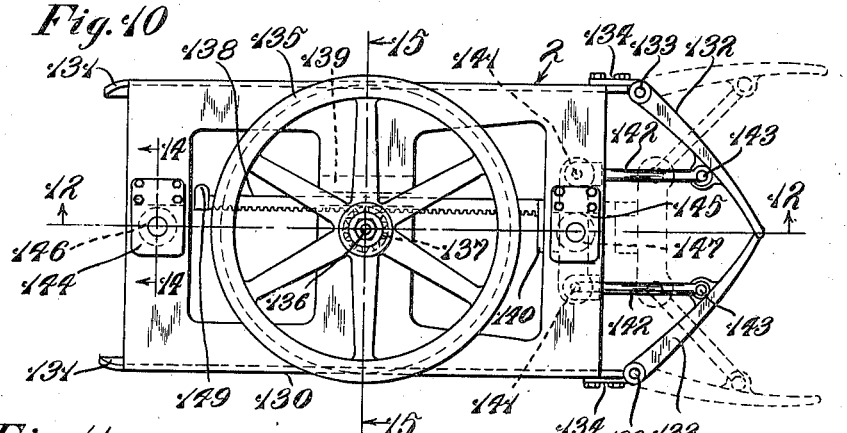

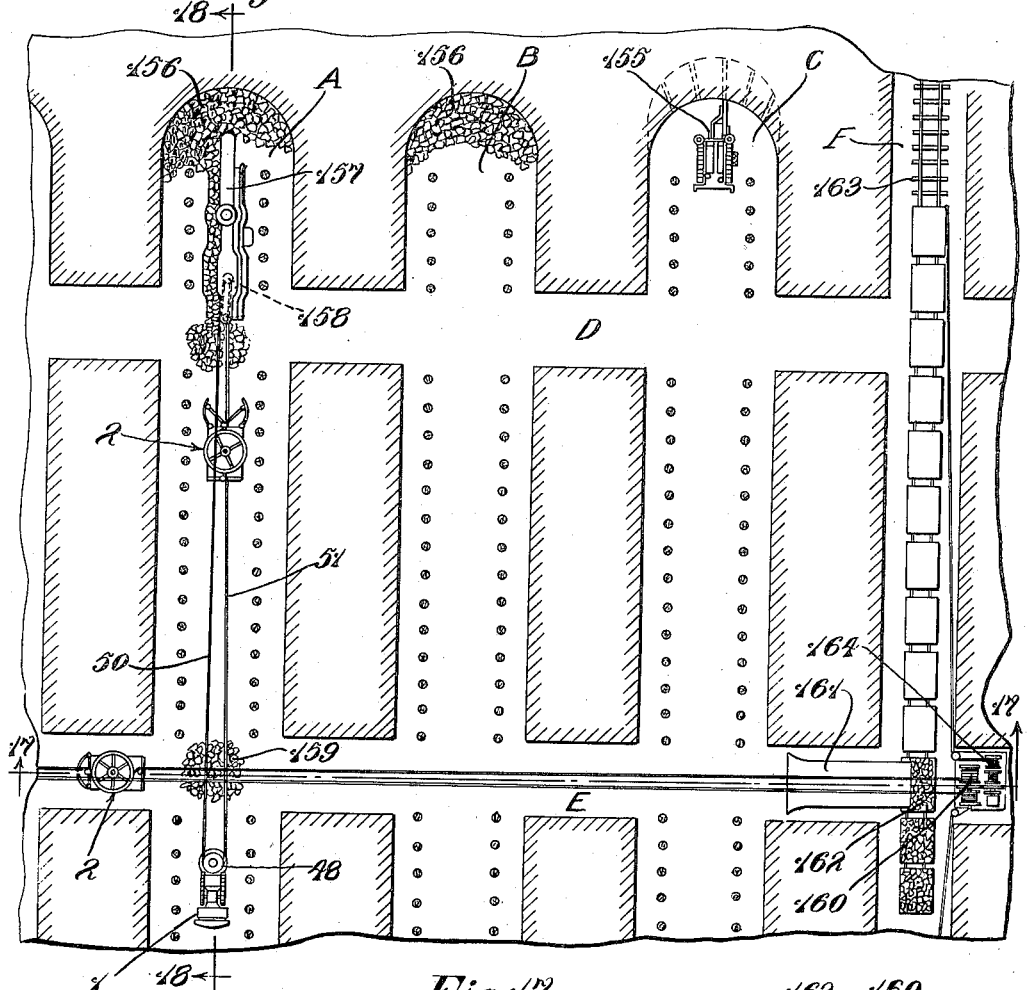

Patented Apr. 12, 1938

2,113,760

UNITED STATES PATENT OFFICE 2,113,760

APPARATUS FOR HANDLING MATERIAL

Joseph F. Joy, Claremont, N. H., assignor to Sullivan Machinery Company, a corporation of Massachusetts Application July 1, 1935, Serial No. 29,308

21 Claims. (Cl. 214—110)

This invention relates to an improved apparatus for handling material, and more particularly has reference to an improved portable drag line scraper outfit especially designed to use in handling loose materials in mines.

An object of this invention is to provide an improved apparatus for handling material. Another object is to provide an improved portable drag line scraper outfit especially designed to use in handling loose material in mines and embodying an improved drag line scraper hoist for operating an improved material gathering and moving mechanism. Still another object is to provide an improved scraper loader mechanism operated by a drag line hoisting mechanism and having embodied therein improved means for penetrating and gathering the material to be loaded. Yet another object of this invention is to provide an improved scraper mechanism having improved material penetrating and gathering means and improved means for moving the latter into its penetrating and gathering positions. A further object is to provide an improved drag line hoisting mechanism having associated therewith improved scraper loader mechanism operated by the hoist drag lines for penetrating and gathering the material to be loaded. These and other objects and advantages of the invention will, however, hereinafter more fully appear.

In the accompanying drawings there is shown for purposes of illustration one form which the invention may assume in practice.

In these drawings,—

Fig. 1 is a plan view of the illustrative form of the improved self-propelled drag line scraper hoisting mechanism.

Fig. 2 is a side elevational view of the hoisting mechanism shown in Fig. 1, with a portion of the casing broken away to illustrate details of the interior construction.

Fig. 3 is an enlarged view in longitudinal section taken substantially on line 3—3 of Fig. 1.

Fig. 4 is a cross sectional view taken substantially on line 4—4 of Fig. 3.

Fig. 5 is a horizontal sectional view taken substantially on line 5—5 of Fig. 3.

Fig. 6 is an enlarged vertical sectional view illustrating the drum clutch control mechanism shown in Fig. 3, the view taken substantially on line 6—6 of Fig. 5.

Fig. 7 is a horizontal sectional view taken substantially on line 7—7 of Fig. 3.

Fig. 8 is a diagrammatic view showing the improved hydraulic fluid system and the associated control means.

Fig. 9 is a detail sectional view illustrating the by-pass valve device.

Fig. 10 is a plan view showing the illustrative form of the improved drag scraper loader mechanism.

Fig. 11 is a side elevational view of the mechanism shown in Fig. 10.

Fig. 12 is a view in longitudinal section taken substantially on line 12—12 of Fig. 10.

Fig. 13 is a horizontal view with parts omitted taken substantially on line 13—13 of Fig. 12.

Fig. 14 is a detail sectional view taken on line 14—14 of Fig. 10.

Fig. 15 is a cross sectional view taken substantially on line 15—15 of Fig. 10.

Fig. 16 is a diagrammatic sectional plan view showing the improved method for operating the improved material handling apparatus in a mine.

Figs. 17 and 18 are sectional views taken substantially on lines 17—17 and 18—18 of Fig. 16 and likewise illustrating the improved material handling method.

In this illustrative embodiment of the invention there is shown a drag line scraper hoist generally designated 1 having associated therewith an improved scraper loader mechanism generally designated 2. The scraper hoist 1, shown in Figs. 1 to 9, inclusive, generally comprises a self-propelled base 3 having mounted thereon drag line hoisting means generally designated 4. The base 3 comprises a body 5 mounted on and supported by endless track-laying treads 6, 6 arranged at opposite sides of the body. The tractor treads comprise tread frames 7 rigidly secured to the sides of the body 5 and embodying upper and lower guide members 8 and 9 having guideways in which are guided endless track-laying chains 10. These track-laying chains are herein of the block type carrying cleat-like plates engageable with the mine floor for propelling the hoist. The forward portions of these endless tractor chains are guided by guide sprockets 11 journaled on adjustable bearing blocks 12 mounted in longitudinal guideways 13 formed on the tread side frames 7, and these bearing blocks are adjustable longitudinally within their guideways by means of adjusting screws 14. By adjusting the screws 14 the bearing blocks 12 may be slid in their guideways to move the guide sprockets 11 longitudinally with respect to the tread frames 7, thereby to take up any undue slack in the chains. The rearward portions of the tread chains engage drive sprockets 15, 15 having their hubs keyed to the projecting ends of alined rear axles 16 and 17 journaled in bearings 18 supported by bearing supports 19 attached to a differential housing 20 secured to the hoist body 5. Arranged within this differential housing is a differential 21 of a standard automotive design including a rotatable support 22 carrying bevel planet gears 23 meshing with coaxial bevel gears 24 and 25 fixed to the alined axles 16 and 17, respectively, and the support 22 is driven by a worm wheel 26 fixed thereto and meshing with the teeth of a drive worm 27. As shown in Fig. 3, the drive worm 27 is fixed to a longitudinal shaft 28 journaled within bearings 29 supported within the differential housing 20. Arranged centrally within the hoist body 5 is a motor 30, herein preferably of the reversible electric type, having its power shaft 31 horizontally disposed and extending longitudinally of the hoist body. Connected to the rear end of the motor power shaft by a coupling 32 of a conventional design is a planetary, slip controlled change speed mechanism generally designated 33 likewise of a standard automotive design and embodying frictionally controlled planet gears for effecting drive of a shaft 34 at high, low and medium speeds under frictional control at each speed, and also reverse frictionally controlled drive of the shaft 34. As this planetary transmission mechanism is of a well known design, detailed description thereof is herein considered unnecessary. Connectible to the shaft 34 by a clutch 35 is an alined shaft 36 suitably journaled within the hoist body and having keyed thereto a spur pinion 37 meshing with a spur gear 38 keyed to the longitudinal worm drive shaft 28 heretofore referred to. As shown in Fig. 4, fixed to the inner sides of the tread chain drive sprockets 15, 15 are brake drums 39 and 40, respectively, having cooperating therewith contractible brake bands 41 and 42. Each of these brake bands is provided with a suitable lever type operating mechanism 43 controlled by a hand lever 44. From the foregoing it will be evident that the track-laying treads may be driven by the motor 30 under frictional control at three forward speeds and in reverse by the planetary transmission mechanism 33, clutch 35, shaft 36, spur gearing 37, 38, worm gearing 27, 26, differential gears 23, 24, 25 and the alined axles 16 and 17 driving the sprockets 15, 15. By regulating the brake bands 41 and 42 the drive of the track-laying treads may be controlled to effect speeding up of the drive of one tread and slowing down of the other, thereby to enable steering of the hoist as it is propelled over the mine floor in a well known manner. It will thus be seen that the hoist is self-propelled and may be moved and guided by the track-laying treads during propulsion thereof over the mine floor.

The hoisting means generally designated 4 embodies a pair of relatively rotatable hoisting drums 48 and 49 arranged in superimposed coaxial relation on the upper portion of the hoist body, and wound on these drums are portions 50 and 51 of an endless drag line cable or rope, as shown in Fig. 2. These drums are journaled for rotation about a vertical axis on bearings supported by a centrally located tubular shaft 52, in turn journaled in bearings supported within a front gear housing 53 attached to the front end of the hoist body 5. Disc clutches 54, 55 are provided for connecting the drums 48 and 49 to the tubular shaft 52. Keyed to the forward end of the motor power shaft 31 is a spur pinion 56 meshing, as shown most clearly in Fig. 5, with a spur gear 57 keyed to a longitudinal shaft 58 suitably journaled in the gearing housing 53. Fixed to this shaft is a worm 59 meshing with a horizontal worm wheel 60 arranged within the gearing housing and fixed to the lower end of the vertical shaft 52 (see also Fig. 6).

The operating means for the disc clutches 54 and 55 comprises, as shown most clearly in Fig. 6, a hydraulic cylinder 61 arranged coaxially with and projecting within the tubular shaft 52 (see also Fig. 3). This cylinder contains a vertically reciprocable piston 62 having fixed thereto a tubular rod 63 projecting upwardly through the packed upper head 64 of the cylinder and threadedly secured at its upper end within a block 65 above the upper hoisting drum. Also fixed within the piston 62 and extending coaxially through the tubular rod 63 is a tubular rod 66 having its upper end threadedly fixed within an upper block 67. The block 67 has a depending cylindrical projection 68 which fits tightly in a bore formed in the lower block 65, thereby to provide an upper closure for a chamber 69 in the lower block. Formed in the upper block is a chamber 70 with which the inner tubular rod 66 communicates. Hydraulic pressure is adapted to be supplied to the chambers 69 and 70 in the blocks in a manner to be later described. The clutches 54, 55 are provided with a clutch applying plate 71 having engaging its opposite surfaces ball thrust bearings 72, 73, and surrounding the tubular rod 63 is a tubular sleeve 74 while engaging the lower thrust bearing 73 and fixed to the tubular rod 63 is a collar 75. The sleeve 74 is guided in a bore 76 formed in a top cap plate 77 threadedly secured within the upper end of the tubular shaft 52 and forming a housing for the upper bearing of the hoisting drum 48. The shaft 52 is vertically slotted at 78, and the arms of the clutch applying plate 71 project through these slots into engagement with the thrust bearings 72, 73 in the manner shown. When hydraulic pressure is supplied from the chamber 70 through the inner tubular rod 66 and through an axial opening 79 in the piston to the lower end of the hydraulic cylinder, the piston 62 is moved upwardly to shift the clutch applying plate 71 in a direction to apply the upper clutch 54 to connect the upper drum 48 to the drive shaft 52. When hydraulic pressure is supplied from the chamber 69 through the tubular rod 63 and openings 80 in the lower end of the rod to the upper end of the hydraulic cylinder, the piston 62 is moved downwardly to move the clutch applying plate 71 in a direction to apply the lower clutch 55 to connect the lower drum 49 to the drive shaft 52. It is accordingly evident that the hoisting drums 48 and 49 may be selectively connected in driving relation with the motor 30 and are driven from the motor through the spur gearing 56, 57, worm gearing 59, 60 and the vertical drive shaft 52.

In this illustrative construction, mounted within the rearward portion of the hoist body 5 is a controller and resistance box 85 connected by an electrical conductor cable 86 to a switch and fuse box 87 and an electrical conductor cable 88 to the motor 30. Arranged at opposite sides of the hoist body and rigidly fixed within the side tread frames between the latter and the differential housing is a pair of hydraulic anchor jacks 89, each comprising a vertical hydraulic cylinder 90 containing a vertically reciprocable piston 91 having an upwardly extending piston rod 92 passing through a packed opening in the upper cylinder head 93. The upper end of the piston rods 92 are provided with abutment engaging points 94 for engagement with a suitable extraneous abutment, for instance the mine roof, for rigidly jacking the hoist in a stationary operating position against the mine floor.

The means for supplying hydraulic pressure to the jack cylinders 90 and the operating cylinder 61 for the drum control clutches comprises a hydraulic pump 96, preferably of a conventional triple rotor type, attached to the gear housing 53 and having a pump chamber 97 containing intermeshing pump rotor gears 98, one of which is keyed to the projecting end of the longitudinal drive shaft 58, as shown in Fig. 5. The chamber within the gear housing 53 provides a reservoir 99 for containing a liquid, and this pump is adapted to pump liquid under pressure from the reservoir through suitable passages and conduits, to be later described, to the hydraulic cylinders above referred to. Now referring to the hydraulic fluid system and the associated control means shown in Figs. 8 and 9, it will be observed that the discharge chambers of the rotors of the pump 96 are connected through conduits 100 and 101 respectively, to a by-pass valve device 102, and a return conduit 103 connects the by-pass valve device to the reservoir 99. The main supply conduit 104 leads from the by-pass valve device to a control valve box 105. As shown in Fig. 9, the by-pass valve device 102 comprises a valve box 106 having a passage 107 connecting the conduit 100 to the conduit 104. A parallel passage 108 communicates with the conduit 101 and is connected by a passage 109 to the passage 107. Formed in the valve box is a chamber 110 communicating with the conduit 103 and connected by a passage 111 to the passage 108. The passages 109 and 111 are controlled by end seating valves 112 and 113 respectively, having a pivoted control lever 114. When the valves 112, 113 are in the position shown in Fig. 9, passages 107, 108 are connected together by the passage 109 so that both conduits 100 and 101 communicate with the conduit 104. When the control lever 114 is swung into its opposite position, the passage 109 is closed by the valve 112, while the passage 111 is open so that the conduit 101 communicates with the return conduit 103 through passage 111 and chamber 110, and the conduit 100 communicates through the passage 107 with the conduit 104. Again referring to Fig. 8, it will be noted that the control valve box 105 has parallel vertical bores 115 containing rotary control valves 116 and 117 respectively, each having a manual control handle. The lower ends of the valve bores are connected by a supply passage 118 with which the supply conduit 104 communicates, while a discharge passage 119 connects the upper ends of the valve bores with a return conduit 119' leading to the reservoir 99. The valve 116 controls the supply of liquid pressure to the clutch control cylinder 61, and conduits 120, 121 connect the chambers 70, 69 in the blocks 67, 65, respectively, (see also Fig. 6) with the bore of the valve 116. The valve 117 controls the supply of liquid pressure to the anchor jack cylinders and the valve bore is connected by a conduit 122 and branch conduits 123 to the upper ends of the anchor jack cylinders, while the valve bore is connected through a conduit 124 and branch passages 125 to the lower ends of the anchor jack cylinders. When the valve 116 is in the position shown in Fig. 8, liquid under pressure may flow from the supply passage 118 through a passage on the valve 116, conduit 120, chamber 70, tubular rod 66 and passage 79 in the piston 62 to the lower end of the clutch control cylinder 61, thereby to effect upward movement of the piston 62 to apply the friction clutch 54 for the upper hoist drum 48, while the upper end of the cylinder 61 is connected to exhaust through passages 80, tubular rod 63, chamber 69, conduit 121 and a passage on the valve 116 communicating with the discharge passage 119. When the position of the valve 116 is reversed, liquid under pressure may flow from the supply passage 118 through a passage on the valve 116, conduit 121, chamber 69, tubular rod 63 and passages 80 to the upper end of the hydraulic cylinder 61 to effect downward movement of the piston 62 to apply the friction clutch 55 for the lower hoisting drum 49, while the lower end of the cylinder 61 is connected through passage 79, tubular rod 66, chamber 70, conduit 120 and a passage on the valve 116 to the discharge passage 119. When the valve 117 is in the position shown in Fig. 8, liquid under pressure may flow from the supply passage 118 through a passage on the valve 117, conduit 124 and branch conduits 125 to the lower ends of the anchor jack cylinders to effect upward movement of the anchor jack pistons in an anchoring position, while the upper ends of the anchor jack cylinders are connected through the branch conduits 123, conduit 122 and a passage on the valve to the discharge passage 119. When the position of the valve 117 is reversed, liquid under pressure may flow from the supply passage 118 through a passage on the valve, conduit 122 and branch conduits 123 to the upper ends of the jack cylinders to effect downward movement of the anchor jack pistons into their released position, while the lower ends of the jack cylinders are connected through branch conduits 125, conduit 124, a passage on the valve 117 to the discharge passage 119. When the valves 116, 117 are moved into their closed position, the liquid is trapped in the cylinders, and when liquid flow through the supply conduit 104 is cut off by the valves 116, 117, the liquid discharged from the pump is by-passed through the by-pass valve device back to the reservoir 99. When both conduits 100 and 101 are connected with the conduit 104, the pressure in the hydraulic system is, of course, increased, since liquid is pumped at that time from both discharge chambers of the pump.

The scraper mechanism generally designated 2 comprises, as shown in Figs. 10 to 15, inclusive, a box-like scraper frame 130 having bottom side runners 131, 131 slidingly engageable with the mine floor. The scraper frame 130 is open at its forward and rearward ends, and pivotally mounted at the forward open end of the scraper frame are cooperating material penetrating and gathering elements 132, 132 of claw-like form, these gathering elements being pivotally mounted about vertical axes at 133 on brackets 134 secured to the opposite side walls of the scraper frame. Journaled on the top of the scraper frame is a large horizontal pulley wheel 135 keyed to a vertical shaft 136 journaled within the top of the scraper frame. As shown in Fig. 12, keyed to the lower end of the shaft 136 and driven thereby is a spur gear 137 meshing with the teeth of a rack 138 guided for longitudinal sliding movement in a guideway 139 secured beneath the top of the scraper frame. Secured to the forward end of the rack 138 is an eye member 140 having pivotally connected thereto at 141, 141 links 142, 142, the latter in turn being pivotally connected at 143 to the gathering elements 132. As shown in Fig.

14, journaled within brackets 144 and 145 secured to the top of the scraper frame at the opposite ends of the latter respectively at the rear of and in advance of the pulley wheel 135 are horizontal guide sheaves 146 and 147. The forward penetrating edges of the claw-like gathering arms or blades 132 are formed with tooth-like serrations 148 for facilitating penetration of the material during the gathering operation. In this instance, the cable portion 51 of the lower hoisting drum 49 extends about the rear guide sheave 146, around the pulley wheel 135 and about the front guide sheave 147 forwardly to a suitable guide pulley, to be later described, anchored in advance of the scraper mechanism, and the other cable portion 50 extends from this anchored guide pulley back to the upper hoisting drum 48. As the hoisting drums are operated, one cable portion is payed out from one drum while the other cable portion is wound in by the other drum so that the moving cable portion engaging the pulley wheel 135 rotates the pulley wheel to effect forward sliding movement of the rack 138 to swing the gathering blades 132 from their closed position indicated in full lines in Fig. 10 to the open dotted line position in that figure. When the gathering elements are in their wide open position, a stop lug 149 on the rear end of the sliding rack 138 engages the rear end of the rack guide 139 to prevent further outward swinging movement of the gathering elements. Upon continued winding in of the drag line cable, the scraper mechanism is moved bodily with the moving cable portion toward the material to be loaded to cause the gathering elements to penetrate the material. Upon reversal of the hoisting drums the rack 138 is moved rearwardly with respect to the scraper frame by the moving cable portion engaging the pulley wheel to cause the gathering elements to swing inwardly from the dotted line position shown in Fig. 10 to their closed position shown in full lines in that figure, and upon continued movement of the hoisting cable, the scraper mechanism is moved bodily rearwardly with the cable to move the material grasped therein by the gathering elements in a rearward direction to a suitable point of disposal. The operations of moving the scraper mechanism forwardly to penetrate the material, closing the gathering elements to grasp the material and moving the scraper mechanism bodily rearwardly to drag the material to a suitable point of disposal occur in rapid succession, and as the material is loaded, the scraper mechanism is advanced toward and from the material under the control of the hoisting drums.

The method of operating the improved material handling apparatus, above described, in a coal mine is shown diagrammatically in Figs. 16, 17 and 18. In these diagrammatic sectional views, A, B and C indicate the rooms or stalls; D and E indicate the loading galleries, and the mine entry is indicated at F. In accordance with this method of handling material, a coal cutting machine 155 is operated in the room or stall C to cut kerfs in the coal. During this cutting operation, the cut face in the room or stall B is shot down, the shot coal being indicated at 156. Located in the room or stall A is a coal loading machine 157 for gathering the broken down coal at the face and moving the coal rearwardly away from the face into the gallery D. Arranged in the room or stall A at the outer side of the gallery E is the hoisting mechanism 1, while operating between the pillars extending between the galleries D and E is the scraper mechanism 2. The cable is shown extending from one hoisting drum past the sheaves and pulleys on the scraper mechanism and around an anchored pulley 158 and then rearwardly back to the other hoisting drum. As the scraper mechanism is operated by the hoisting mechanism it moves forwardly to gather the material discharged by the loading machine in gallery D and then moves rearwardly to move the material gathered thereby to discharge the material at 159 in the gallery E. Operating at right angles to the scraper mechanism above described in the gallery E is a scraper mechanism 2 operated by a hoisting mechanism 160 located in the gallery E near the mine entry F, and this scraper mechanism is adapted to gather the material in the coal pile 159 and move the material along the gallery E up an inclined locating platform 161 to discharge in a mine car 162 guided on a mine trackway 163 laid on the floor of the mine entry F. The hoisting mechanism 160 embodies a hoisting drum 164 for spotting the mine cars beneath the discharge end of the loading slide 161, and as the cars are loaded they are moved along the trackway from beneath the loading slide. These and other methods of use and advantages of the improved material handling apparatus will be clearly apparent to those skilled in the art.

The structure of the scraper per se is being claimed in my divisional application Serial No. 69,697, which will mature into a patent on the same day with this application. The structure of the hoisting mechanism per se forms the subject matter of my copending application Serial No. 69,696, filed Mar. 19, 1936.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a material handling apparatus, hoisting mechanism, a scraper loader mechanism having relatively movable gathering means and means for moving said gathering means into and out of material gathering position, and flexible transmission connections operated by said hoisting mechanism and operatively connected to said scraper loader mechanism for bodily moving the latter toward and from the material to be loaded, an intermediate portion of said flexible transmission connections operatively connected to said moving means for said gathering means for operating the latter, said transmission connections movable relative to said scraper loader mechanism, while the latter remains stationary as regards bodily movement, to actuate said moving means.

2. In a material handling apparatus, hoisting mechanism having relatively rotatable cable winding drums, a scraper loader mechanism having relatively movable gathering means and means for moving said gathering means into and out of gathering position, and means on said scraper mechanism operated by a cable having its end portions wound on said drums and having its intermediate portion connected to said scraper loader mechanism for bodily moving the latter toward and from the material to be loaded, an intermediate portion of said cable operatively connected to said moving means for said gathering means for actuating the latter, said cable portion movable relative to said scraper loader mechanism, while the latter remains stationary as regards bodily movement, to actuate said moving means.

3. In a material handling apparatus, a hoisting mechanism, a scraper loader mechanism including a scraper having movable gathering means and means on said scraper for moving said gathering means into and out of gathering position with respect to said scraper, and flexible transmission connections extending between said hoisting mechanism and said scraper loader mechanism for bodily moving the latter toward and from the material to be loaded, an intermediate portion of said flexible transmission connections operatively connected to said moving means for said gathering means for actuating the latter, said transmission connections movable relative to said scraper loader mechanism, while the latter remains stationary as regards bodily movement, to actuate said moving means.

4. In a material handling apparatus, a hoisting mechanism having relatively rotatable cable winding drums, a scraper loader mechanism having relatively movable gathering means and means for moving said gathering means, a cable having its end portions wound on said winding drums and its intermediate portion operatively connected to said scraper loader mechanism for actuating said moving means for said gathering means.

5. In a material handling apparatus, cable winding mechanism, a loading mechanism having a movably mounted gathering element, and means for actuating said gathering element into and out of its gathering position including a pulley wheel mounted on said loading mechanism and rotated by the cable of said cable winding mechanism and means actuated by said pulley for moving said gathering element.

6. In a material handling apparatus, a cable winding mechanism having relatively rotatable winding drums and a cable having its end portions wound on said drums, an anchored pulley around which the intermediate portion of said cable passes for guiding said cable, a loading mechanism having a movably mounted material gathering element, and means for actuating said gathering element including a cable engaging pulley mounted on said loading mechanism, the intermediate portion of said cable between one of said drums and said anchored pulley engaging said pulley of said loading mechanism for rotating said latter pulley.

7. In a material handling apparatus, a hoisting mechanism, a scraper loader mechanism comprising a scraper having relatively movable gathering means and mechanism for moving said gathering means relative to said scraper including an actuating member and reduction gearing connecting said actuating member to said gathering means, and flexible transmission connections actuated by said hoisting mechanism and operatively connected to said actuating member of said moving mechanism for driving the latter.

8. In a material handling apparatus, a cable winding mechanism, an anchored pulley located near the material to be loaded, a cable extending from said winding mechanism around said pulley, a scraper loading mechanism including a scraper having relatively movable material gathering means, and means for actuating said gathering means relative to said scraper and for bodily moving said scraper mechanism including a pulley mounted on said scraper and engaged by the portion of the cable extending between said winding mechanism and said anchored pulley.

9. In a material handling apparatus, a cable winding mechanism comprising relatively rotatable cable winding drums, a scraper loader mechanism including a scraper having movable gathering means and a pulley for actuating said gathering means relative to said scraper, an anchored pulley located near the material to be gathered, a cable extending from one drum around said anchored pulley and from said anchored pulley around said pulley on said scraper and from said latter pulley to said other drum, movement of said cable relative to said scraper loader mechanism while the latter is stationary effecting rotation of said pulley of said scraper loader mechanism for actuating said gathering means relative to said scraper.

10. In a material handling apparatus, a haulage mechanism comprising relatively rotatable cable winding drums, an anchored pulley located near the material to be loaded, a cable having its end portions wound on said drums and its intermediate portion passing around and guided by said anchored pulley, a scraper slide comprising a body for receiving the material, material penetrating means on said body for penetrating the material and moving and retaining the material within said slide body, and means for actuating said penetrating and moving means including a pulley wheel on said slide body for frictionally engaging and rotated by a portion of the cable extending between said anchored pulley and said haulage mechanism.

11. In a material handling apparatus, a haulage mechanism comprising relatively rotatable cable winding drums, an anchored pulley located near the material to be loaded, a cable having its end portions wound on said drums and its intermediate portion passing around and guided by said anchored pulley, a scraper slide comprising a body for receiving the material, material penetrating means on said body for penetrating the material and moving and retaining the material within said slide body, and means on said body for actuating said penetrating and moving means including a pulley wheel on said slide body for frictionally engaging and rotated by a portion of the cable extending between said anchored pulley and said haulage mechanism, the cable portion engaging said pulley wheel moving relative to the slide during movement of the penetrating and moving means into and out of penetrating position, and said slide moving bodily with the cable portion when said penetrating means is in either its open penetrating or closed retaining position with respect to said slide body.

12. In a material handling apparatus, a haulage mechanism comprising relatively rotatable cable winding drums located at a point remote from the material to be loaded, an anchored pulley located near the material to be loaded, a cable having its end portions wound on said drums and its intermediate portion passing around and guided by said anchored pulley, a scraper slide having material penetrating and moving means, and means for actuating said penetrating and moving means, said actuating means engaging and actuated by a portion of the cable extending between the anchored pulley and said haulage mechanism, said cable portion moving relative to the slide while the latter remains stationary as regards bodily movement to effect actuation of said actuating means, and said slide moving bodily with said cable portion during bodily movement of the slide toward and from the material to be loaded.

13. In a material handling apparatus, a haulage mechanism comprising relatively rotatable cable winding drums located at a point remote from the material to be loaded, an anchored pulley located near the material to be loaded, a cable having its end portions wound on said drums and its intermediate portion passing around and guided by said guide pulley, a scraper slide having movable means for penetrating the material and moving and retaining the material within the slide, and means for moving said material moving and penetrating means into and out of its material penetrating position, said moving means including means frictionally engaging and actuated by a portion of the cable extending between the anchored pulley and said haulage mechanism, movement of the cable portion relative to the slide while the latter remains stationary effecting movement of said penetrating and moving means either toward or from its penetrating position and said slide moving bodily with the cable portion through its frictional engagement therewith during bodily movement of the slide toward and from the material, when said penetrating means is in either its open penetrating position or its closed retaining position.

14. In a material handling apparatus, a haulage mechanism comprising relatively rotatable cable winding drums, an anchored pulley located near the material to be loaded, a cable having its end portions wound on said drums and its intermediate portion passing around and guided by said anchored pulley thereby to provide pull and tail cable portions, a scraper loader mechanism having a material receiving body, movable means for penetrating the material and for moving and retaining the material in the body, and means on the body for actuating said material penetrating and moving means with respect thereto, said actuating means operatively connected to and actuated by the pull cable portion of said cable extending between said anchored pulley and said haulage mechanism, said cable portion moving relative to the scraper mechanism while the latter remains stationary during actuation of said actuating means, and the scraper mechanism moving bodily with the pull cable portion during movement of the scraper mechanism toward and from the material to be loaded.

15. In a material handling apparatus, cable winding mechanism, a loading mechanism having a movably mounted gathering element, means for moving said gathering element into and out of its gathering position including a rotatable member mounted on said loading mechanism, said rotatable member engaging the cable of said cable winding mechanism and rotated thereby, and means on said loading mechanism actuated by the rotary motion of said rotatable member for moving said gathering element.

16. In a material handling apparatus, cable winding mechanism having relatively rotatable winding drums and a cable having its end portions wound on said drums, an anchored pulley located at a point remote from said winding drums and around which the intermediate portion of said cable passes for guiding said cable, a loading mechanism having a movably mounted material gathering element, and means for actuating said gathering element including a rotatable element mounted on said loading mechanism and operatively connected to said gathering element, the intermediate portion of said cable between one of said drums and said pulley engaging said rotatable element of said loading mechanism for rotating said rotatable element.

17. In a material handling apparatus, a cable winding mechanism, an anchored pulley located near the material to be loaded, a cable extending from said winding mechanism around said pulley, a scraper loading mechanism including a scraper having relatively movable material gathering means, and means for actuating said gathering means relative to said scraper and for bodily moving said scraper mechanism including a rotatable member mounted on said scraper and engaged by the portion of the cable extending between said winding mechanism and said anchored pulley, said rotatable member rotatable by said cable to effect movement of said material gathering means relative to the scraper.

18. In a material handling apparatus, a cable winding mechanism comprising relatively rotatable cable winding drums, a scraper loader mechanism including a scraper having movable gathering means and a rotatable member on said scraper for actuating said gathering means relative to said scraper, an anchored pulley located near the material to be gathered at a point remote from said winding mechanism, a cable extending from one drum around said anchored pulley and from said anchored pulley around said rotatable member on said scraper and from said rotatable member to said other drum, movement of said cable relative to said scraper loader mechanism while the latter is stationary effecting rotation of the rotatable member of said scraper loader mechanism for actuating said gathering means relative to said scraper.

19. In a material handling apparatus, a cable winding mechanism, an anchored pulley located near the material to be loaded, a cable extending from said winding mechanism around said pulley, a scraper loading mechanism including a scraper having relatively movable means for penetrating the material and for moving and retaining the material within said scraper, and means for actuating said material penetrating and moving means relative to said scraper and for bodily moving said scraper mechanism toward and from the material to be loaded including a rotatable member mounted on said scraper and engaged by the portion of the cable extending between said winding mechanism and said anchored pulley, said rotatable member rotatable by said cable upon movement of the latter relative to said loading mechanism to effect movement of said material penetrating and moving means relative to said scraper, and means for holding said rotatable member against rotation when said material penetrating and moving means is either in its open penetrating position or its closed retaining position, to effect bodily movement of the loading mechanism with said cable.

20. In a material handling apparatus, in combination, a haulage mechanism, a scraper loader mechanism comprising a scraper having relatively movable means for penetrating the material and moving and retaining the material within the scraper, mechanism for actuating said penetrating, moving and retaining means relative to said scraper comprising a rotatable member on said scraper and reduction gearing actuated by said rotatable member and connected to said penetrating, moving and retaining means, and a cable actuated by said haulage mechanism and engaging said rotatable member for rotating the latter.

21. In a material handling apparatus, in combination, a haulage mechanism, a scraper loader mechanism comprising a scraper having relatively movable means for penetrating the material and moving and retaining the material within the scraper, mechanism for actuating said penetrating, moving and retaining means relative to said scraper comprising a slide bar guided on said scraper and connected to said penetrating, moving and retaining means, and a cable actuated by said haulage mechanism and operatively connected to said slide bar for actuating the latter.

JOSEPH F. JOY.